Oct. 21, 1969  S. KRAEMER ET AL  3,473,904
APPARATUS AND PROCESS FOR THE CONTINUOUS PRODUCTION
OF FOAMED GLASS AND FOAMED CERAMIC
Filed Aug. 5, 1966
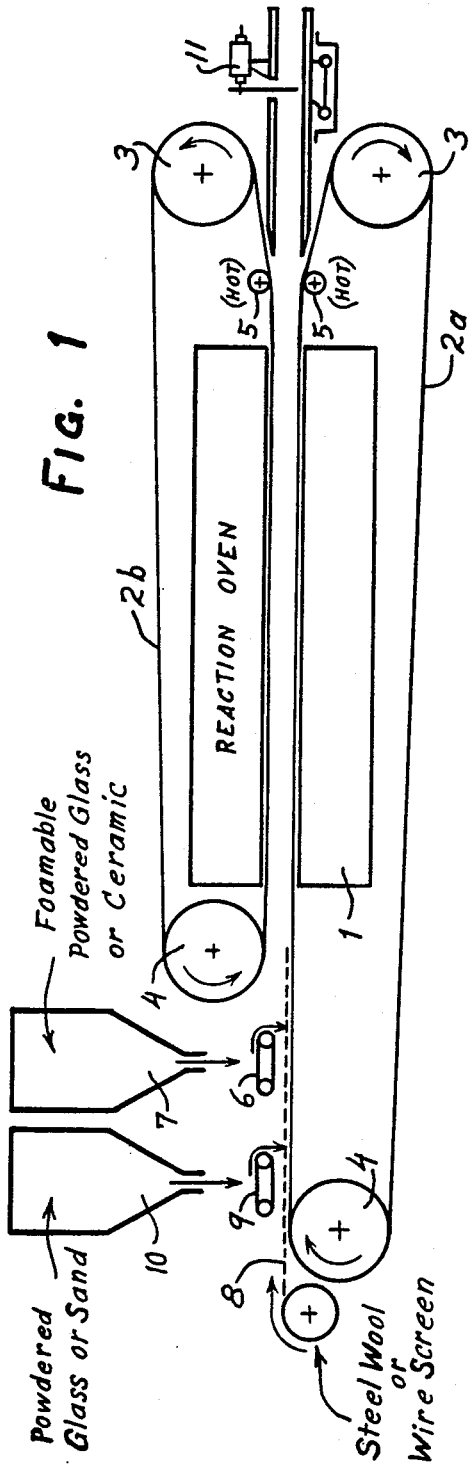
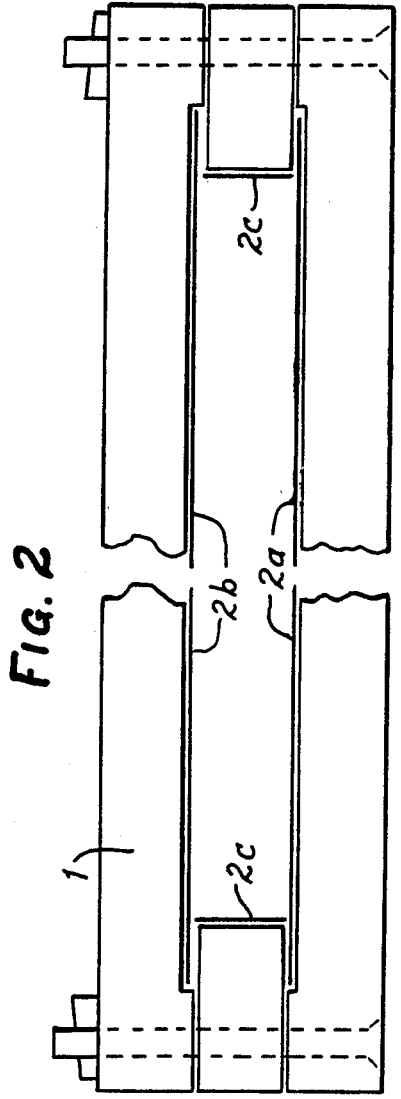
INVENTORS
STEFAN KRAEMER
ALOIS SEIDL
RICHARD MAYER
LUDWIG STREIBL
BY *Krafft & Wells*
ATTORNEYS

United States Patent Office 3,473,904
Patented Oct. 21, 1969

3,473,904
APPARATUS AND PROCESS FOR THE CONTINUOUS PRODUCTION OF FOAMED GLASS AND FOAMED CERAMIC
Stefan Kraemer, Essen, Alois Seidl, Thurnstein, Richard Mayer, Mannheim, and Ludwig Streibl, Nuremberg, Germany, assignors to Wasag-Chemie Aktiengesellschaft, Essen, Germany
Filed Aug. 5, 1966, Ser. No. 570,542
Claims priority, application Germany, Aug. 5, 1965, W 39,675
Int. Cl. C03b 19/08
U.S. Cl. 65—22                               8 Claims

ABSTRACT OF THE DISCLOSURE

In this invention powdered or granular starting material, together with required additives, particularly foaming agent and possibly inserted reinforcing fabrics, are deposited directly on an endless lower metal supporting band which conveys the deposited layer into a furnace or oven where the material is heated in a known manner to the foaming temperature. Continuous impervious metal belts enclose the material above and below and also at the sides and as the material expands the metal belts are pressed against adjacent heat- and wear-resistant muffles such as steel, and the foamed product is formed with definite cross-sectional dimensions.

BACKGROUND OF THE INVENTION

Foamed glass and foamed ceramic have heretofore been produced almost exclusively in metallic molds by methods such as those described in U.S. Patent 2,303,885, the disclosure of which is incorporated herein.

The foamable raw material, for example an intimate mixture of powdered glass and a suitable foaming agent, is filled into a mold cavity and is then brought to the required foaming temperature in a furnace or tunnel kiln. When the mold after having remained for a while in the furnace or kiln becomes filled with foam, it is cooled to a temperature of about 500° C. This temperature is sufficiently low for surface solidification whereupon the block is removed from the mold and then subjected to a slow gradual cooling process until it is practically at room temperature. The desired forms are then obtained from such blocks, usually by sawing.

This method of producing foamed glass plates is very uneconomical. The weight and mass of the mold is many times that of the product produced therein, so that by far the greater part of the heat applied is absorbed by the mold without serving any useful purpose. The thermal efficiency in such a process is seldom higher than 3-5%. There is also much work that has to be done thereafter to shape the blocks, and the required cooling time for blocks 10–15 cm. thick is usually many hours. Finally, the crude blocks have to be sawed and cut to the required dimensions, usually as plates. This results in a substantial amount of miscut and worthless waste. The largest pieces that can be produced in this manner measure about 50 x 50 cm.

DESCRIPTION OF THE INVENTION

It is therefore an object of the present invention to provide an improved process for producing foamed glass and foamed ceramic products.

Another object of the invention is the apparatus for carrying out the improved process of the invention.

A particular object of the invention is a continuous process for the preparation of foamed glass and foamed ceramic products.

A further object of the invention is the economy of operation wherein less waste material is obtained in the continuous process.

A still further object of the invention is the fuel economy obtained with the present invention over that of the prior art.

Further objects of the invention are the continuous length, multi-layered and dimensionally defined products of the present invention.

Still further objects and the broad scope of the invention will become obvious from an inspection of the specification and claims, and by reference to the accompanying drawings illustrating particular embodiments of the invention, wherein:

FIGURE 1 is a longitudinal view of the apparatus for carrying out the present invention; and
FIGURE 2 is an end view of the reaction oven of FIGURE 1.

The figures on the drawing show the principle of the invention which, however, is capable of considerable variation as will be obvious to those skilled in the art.

With particular reference to FIGURE 1 endless steel belts 2a and 2b, formed by welding together the ends of steel bands, are shown passing over driving rollers 3 and return rollers 4 with their adjacent sides in parallelism and spaced from each other by a distance equal to the desired thickness of the final product. The belts are spaced only slightly from the walls of the adjacent muffles and are moved along at the same speed. Applicants have found that, contrary to expectation, none of the difficulties of the prior art are encountered if the foamed glass or foamed ceramic is produced between thin heat-resistant metal bands about 0.5 to 1.5 mm. thick.

FIGURE 2 shows reaction oven 1 lined with temperature-stable replaceable muffles having a particular cross-sectional form and a pair of side belts 2c along with belts 2a and 2b. The side belts are moved along at the same speed between the upper and lower belts to to limit the width of the product. By means of a feed belt 6, and possibly in cooperation with a pocketed feed roller, a foamable material, e.g. a mixture of powdered glass and a foaming agent, or a starting material of the kind described in German Patents 1,154,152; 1,173,379; 1,174,676; or 1,182,577, or in German published application 1,200,188, is taken from the hopper 7 and deposited uniformly on the portion of the lower belt 2a which enters the oven. By suitable temperature transitions, which depend on the composition of the material, the latter is caused to foam during its passage through the oven where the fixedly positioned muffles guide the metal bands in parallelism, thereby preventing any deformation of the foamed product which is obtained at the exit of the oven. In order to diminish the friction between the metal bands and the muffles, and to prevent the formation of ruts or grooves, a suitable lubricant such as talcum may be used.

At the exit of the oven, when the foaming pressure is still present in the hot material, the metal bands are cooled by the application of air or steam thereto so as to cause superficial solidification and stabilization of the foamed product. When the metal bands are deflected, preferably over hot rollers 5, the foamed product is readily disengaged, especially if the bands are coated with an aqueous suspension of lime, chalk, $Al_2O_3$, MgO or the like, to which a binder can be added, before the foamable material is deposited thereon. Such a coating can be applied continuously by spraying, or by spraying, immersing, or by the use of rollers.

Since thin metal bands which leave the oven have only a very small heat capacity, the thermal efficiency with 40% heat utilization is about ten times as great as in the prior art method of forming in milds.

Since the strip of foamed glass which leaves the oven is at a temperature of about 100–600° C., it can be cut immediately and automatically into the desired lengths. At the time of the severing, which is established by a terminal switch in the path of the product, a saw 11 is activated and is moved along with the same velocity as the foamed product, the severing being performed either by a circular saw or by a band saw. After the cut is completed, the saw is returned to its initial position. With such a succession of operations the plates can be produced continuously without slowing down the transportation of the foamed product.

Instead of sawing off the individual plates, they can also be severed by cutting or shearing.

The entire severing apparatus is preferably protected against heat losses by keeping it in an insulated enclosure.

For gradual further cooling, the plates while positioned either horizontally or on edge are passed through a cooler preferably by intermittent movement. If the circulation of air through the cooler occurs in stages, a very uniform cooling can be effected. The cooling can also be performed without circulation of air. The cooling can be terminated between 20 and 100° C., depending on the composition of the product and the thickness of the plates.

The continually advancing strip of foamed glass can also be passed immediately through a cooling canal, and subsequently sawed up into plates.

The apparatus and the process are suitable for many uses and are capable of many modifications. The apparatus described above, with suitable variations of temperature, reaction time, reaction zones, etc., can be used for the production of numerous ceramic or glass-like articles of foamed or sintered silica- or alumina-containing raw materials of various compositions, as well as cellular clay, cellular porcelain, and other sintered and foamed products.

The apparatus of this invention can be modified according to the method of manufacture. The muffle furnace can be conveniently divided into sections that are heated to different temperatures, and by lining it with suitable refractories, temperatures up to 1200° C. can be reached. The heat supplied to the furnace may come from any conventional source, i.e., electricity, gas, oil, or other sorce. The cross sectional dimensions of the product can be regulated by suitable dimensioning of the muffles, or by merely repositioning them or substituting them by muffles or other sizes. It is sometimes sufficient to use only upper and lower metal bands, but in special cases, it may also be desirable to use lateral bands as well. It is generally preferable to use metal bands which are heat-stable at the temperatures intended to be used, and also chemically and technically stable at those temperatures. Steel or nickel bands being preferred. To prevent too rapid cooling when the product leaves the furnace, the bands can in that region be passed over heated rollers. For delivering the raw material, suitable devices such as conveyor belts, pocketed wheels, etc., can be provided. For continuous operation of the reaction oven, additional cooling zones, diverting devices, metal or glass atomizers, or devices for applying enamel or glass coatings can be provided. An especially advantageous feature of the present invention, in contrast to the previously known systems, is the possibility of rendering everything completely automatic, all the way from the starting material to the final products, by means of electronic controlling devices. It is also readily possible with this invention to produce laminated, reinforcing or coated products.

For example, it is also possible by the use of another supply device (disposal band 9 and hopper 10) to first deposit powdered glass and/or sand on the lower belt before the foamable material is deposited thereon. The product will then be a foamed glass with a hard-sintered bottom layer. For reinforcing the foamed glass, a wire fabric can be drawn off from a supply roll 8 and fed into the furnace. The raw material can also be deposited on a previously arranged layer of steel wool. After the layer of foamed glass has become attached thereto by cooling to about 500° C., the product can be sprayed on one or two sides of it with metal by using a metal spray gun. It is also possible, after separation of the product from the steel bands, to provide it with a covering of glass over one or two sides.

Example I 150 kg. of rock wool and 1000 liters of sodium silicate solution (310 g. dry substance per liter) are reacted with 1000 liters of water in which 50 kg. of sodium borate, 2 kg. of sugar, and 10 kg. of $ZnSO_4$ are dissolved. During stirring in a steam heated kettle the rock wool is dissolved at the boiling temperature of the solution and the solution is evaporated down to a water content of 62%. The now viscous solution is dried on a rotary drier and is ground in a mill to a maximum granule size of 1 mm. This granular solid intermediate product which still has a water content of 9% is filled into the hopper 7 of FIGURE 1 and is deposited by the feed belt 9 in a layer about 10 mm. thick on the endless lower belt 2a.

Prior to the deposition of the intermediate product upon the steel band 2a there was first deposited a slurry of slaked lime and also a bottom layer of powdered glass and sand in the ratio of 1:3 from the supply hopper 10 and feed belt 9. The material is moved into the muffle furnace where the cross sectional dimensions, as shown in FIGURE 2, are 500 x 40 mm. and the heat is supplied electrically to produce a temperature of 730° C. The material remains in the oven about 20 minutes. After leaving the oven the product traverses a cooling zone that is heated to only 530° C. After being separated from the endless metal bands the product is cut into plates about 100 cm. long. The plates are then further cooled during about 30 minutes to room temperature. The product is finely cellular with a maximum pore size of about 2 mm. diameter and the plates are of uniform dimensions, without any waste pieces.

The plates, which are suitable for building purposes, are entirely waterproof and have excellent heat and sound insulating properties and are compatible with the usual binders.

Example II

The method of Example I is carried out in a similar manner to form bodies of other materials. Foamed glass bodies are produced from a mixture of powdered glass (granule sizes up to 0.005 mm.) and a foaming agent deposited on steel band 2a. In this example the oven temperature is about 540° C. The product is then cut into lengths and further cooled in the usual manner. As in the preceding example, the advantages are economy of energy and a saving of work by continuity of operation.

The preceding examples can be repeated with similar success by substituting the generically and specifically described reactants and operating conditions of this invention for those used in the preceding examples.

We claim:
1. A method of producing a foamed molded product comprising:
 (a) dissolving rock wool in an aqueous boiling sodium silicate solution containing foaming agents;
 (b) evaporating and then drying the solution and grinding the dried material to form a particulate intermediate product;
 (c) depositing a slurry of slaked lime and said particulate intermediate product as a continuous layer upon a continuous lower support band of flexible metal;
 (d) passing the support band with the deposited intermediate product on it together with an upper band of flexible metal through a stationary canal formed of metal muffles;
 (e) heating the support bands and the deposited intermediate product to about 730° C. and maintaining the intermediate product at said temperature for about 20 minutes to foam and sinter said product to expand it against the metal bands and to press the bands against the hot muffles;

(f) cooling the foamed and sintered product to about 530° C.; and (g) separating the foamed and molded product from said bands.

2. The method of claim 1, wherein the lower and upper bands are accompanied during their passage through the canal by flexible metal side bands which are also in slidable metal-to-metal contact with the metal muffles.

3. The method of claim 1, wherein the lower and upper belts with the foamed material between them are separated from the foamed molded product while the latter is further cooled and cut into the required lengths.

4. The method of claim 1, in which a layer of metal reinforcing fabric is deposited continuously on the lower band together with the raw material.

5. An apparatus for the continuous production of foamed or sintered molded bodies of ceramic or glass-like material comprising:

(a) a muffle furnace having a continuous stationary canal, said canal having upper, lower and side walls and entrance and exit openings, said walls and openings defined by heat and wear-resistant muffles;

(b) a continuous lower impervious metal support band sliding along the through said canal from said entrance opening to said exit opening at a given speed, wherein said bodies are maintained in said furnace about 20 minutes and slidably guided by said lower wall;

(c) a continuous impervious metal upper band travelling parallel to said lower support band at said given speed, from said entrance opening to said exit opening, and slidably guided by said upper wall;

(d) continuous impervious metal side bands travelling parallel to each other at said given speed and positioned at right angles to said upper and lower bands, said side bands passing through said canal from said entrance opening to said exit opening, said side bands and said upper and lower bands defining a continuous mold;

(e) means for depositing said raw ceramic or glass-like material as a continuous layer upon said lower impervious metal support band, said means positioned above said lower support band at said entrance of the furnace; and (f) heated rollers in contact with said lower and upper bands disposed adjacent to said bands at said exit opening.

6. The apparatus of claim 5, wherein said bands are of flexible metal and have a thickness of about 0.15 to 1.5 mm.

7. The apparatus of claim 5, wherein said muffle furnace has a plurality of sections defining heating zones with means to heat said furnace to temperatures up to 1200° C. and a cooling zone with means to maintain a temperature between about 100–600° C.

8. The apparatus of claim 5, wherein said muffles make metal-to-metal sliding contact with said continuous bands.

References Cited
UNITED STATES PATENTS

| | | | |
|---|---|---|---|
| 3,184,371 | 5/1965 | Seidl | 161—193 |
| 3,056,184 | 10/1962 | Blaha | 65—22 |
| 3,163,512 | 12/1964 | Schill et al. | 65—22 |
| 3,310,423 | 3/1967 | Ingham | 65—60 |
| 3,325,341 | 6/1967 | Shannon | 65—22 |

S. LEON BASHORE, Primary Examiner

E. R. FREEDMAN, Assistant Examiner

U.S. Cl. X.R.

65—144; 106—40, 75; 161—193